US008806396B2

(12) United States Patent
Liu et al.

(10) Patent No.: US 8,806,396 B2
(45) Date of Patent: Aug. 12, 2014

(54) METHOD AND SYSTEM PERFORMING CIRCUIT DESIGN PREDICTIONS

(75) Inventors: Ming Liu, Milpitas, CA (US); JenPin Weng, Saratoga, CA (US); Taber Smith, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 471 days.

(21) Appl. No.: 12/490,181

(22) Filed: Jun. 23, 2009

(65) Prior Publication Data

US 2009/0319976 A1   Dec. 24, 2009

Related U.S. Application Data

(60) Provisional application No. 61/075,095, filed on Jun. 24, 2008.

(51) Int. Cl.
*G06F 17/50* (2006.01)

(52) U.S. Cl.
USPC ............ 716/55; 716/50; 716/51; 716/52; 716/53; 716/54; 716/100; 716/106; 716/110; 716/111; 716/112; 703/13; 703/14; 430/5; 430/30

(58) Field of Classification Search
USPC .............. 716/50–55, 100–106, 110–112; 703/13–14; 430/5, 30
See application file for complete search history.

(56) References Cited

U.S. PATENT DOCUMENTS

| | | | |
|---|---|---|---|
| 7,103,524 B1 * | 9/2006 | Teig et al. .................. 703/14 | |
| 7,124,386 B2 | 10/2006 | Smith et al. | |
| 7,152,215 B2 | 12/2006 | Smith et al. | |
| 7,155,689 B2 * | 12/2006 | Pierrat et al. .................... 716/52 | |
| 7,174,520 B2 | 2/2007 | White et al. | |
| 7,243,316 B2 | 7/2007 | White et al. | |
| 7,325,206 B2 | 1/2008 | White et al. | |
| 7,353,475 B2 * | 4/2008 | White et al. .................... 716/52 | |
| 7,356,783 B2 | 4/2008 | Smith et al. | |
| 7,360,179 B2 | 4/2008 | Smith et al. | |
| 7,363,099 B2 | 4/2008 | Smith et al. | |
| 7,363,598 B2 | 4/2008 | Smith et al. | |
| 7,367,008 B2 | 4/2008 | White et al. | |
| 7,380,220 B2 | 5/2008 | Smith et al. | |
| 7,383,521 B2 | 6/2008 | Smith et al. | |
| 7,393,755 B2 | 7/2008 | Smith et al. | |
| 7,533,359 B2 * | 5/2009 | Scheffer et al. .............. 716/106 | |
| 7,587,704 B2 * | 9/2009 | Ye et al. .......................... 716/51 | |
| 7,712,056 B2 | 5/2010 | White et al. | |
| 7,757,195 B2 | 7/2010 | Smith et al. | |
| 7,941,768 B1 * | 5/2011 | Wei .................................. 716/54 | |

(Continued)

OTHER PUBLICATIONS

Colin Hui et al., "Hotspot Detection and Design Recommendation Using Silicon Calibrated CMP Model", Proc. of SPIE, 2009, pp. 72751R-1-72751R-12, vol. 7275.

(Continued)

*Primary Examiner* — Nghia Doan
(74) *Attorney, Agent, or Firm* — Vista IP Law Group, LLP

(57) ABSTRACT

Disclosed is a method, system, and computer program product for performing predictions for an electronic design. Embodiments of the invention allow the ability to efficiently update the model predictions at a later time once previously incomplete blocks are completed. Predictions can be efficiently updated after block designs are updated (e.g. after correcting problems detected from model predictions).

36 Claims, 7 Drawing Sheets

(56) References Cited

U.S. PATENT DOCUMENTS

| | | |
|---|---|---|
| 7,962,867 B2 | 6/2011 | White et al. |
| 8,001,516 B2 | 8/2011 | Smith et al. |
| 2003/0229412 A1 | 12/2003 | White et al. |
| 2005/0204327 A1* | 9/2005 | Mukai et al. ............ 716/19 |
| 2009/0031271 A1* | 1/2009 | White et al. ............ 716/10 |

OTHER PUBLICATIONS

Norma Rodriguez et al., "Hotspot Prevention Using CMP Model in Design Implementation Flow", 9th International Symposium on Quality Electronic Design, IEEE, 2008, pp. 365-368.

* cited by examiner

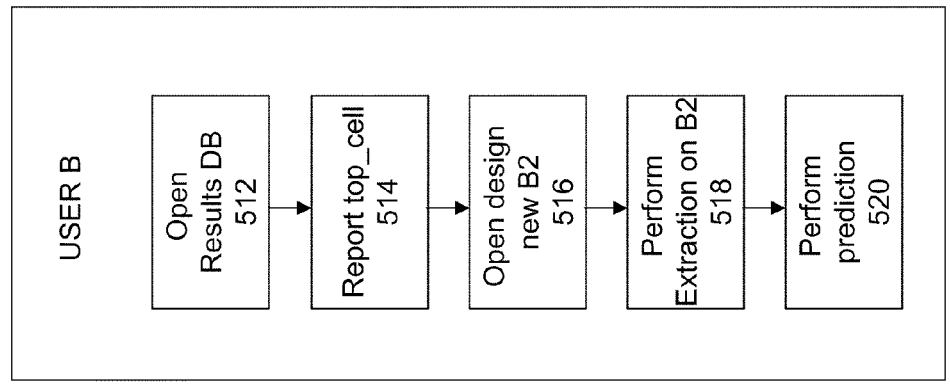
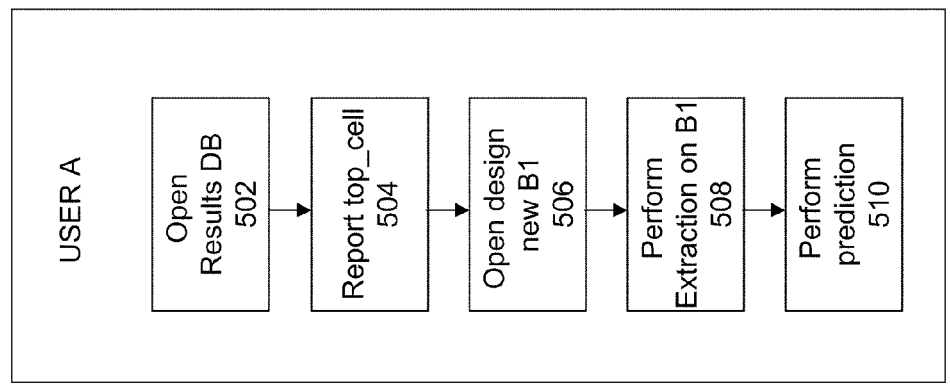
Fig. 5

METHOD AND SYSTEM PERFORMING CIRCUIT DESIGN PREDICTIONS

CROSS-REFERENCE TO RELATED APPLICATIONS

The present application claims the benefit of U.S. Provisional Application Ser. No. 61/075,095, filed on Jun. 24, 2008, which is hereby incorporated by reference in its entirety.

BACKGROUND AND SUMMARY

The invention is directed to an improved approach for designing, testing, and manufacturing integrated circuits.

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. In particular, an integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes.

Based upon this geometric information, photomasks are created for lithographic manufacturing of the electronic product. A photomask, or more simply a "mask," provides the master image of one layer of a given integrated chip's physical geometries. A typical photolithography system projects UV light energy on to and through the mask in order to transmit the mask pattern in reduced size to the wafer surface, where it interacts with a photosensitive coating on the wafer.

Other processes may also occur during the process of manufacturing an intenerated circuit. For example, etching, electroplated copper deposition (ECD), and chemical mechanical polishing (CMP) may be used to form interconnects for the IC. The lithographic patterns define the dimensions of the circuitry that is transferred to a silicon wafer, with the patterns subsequently used with the etch process to physically etch the features into the wafer surface or other thin films deposited on the wafer surface. Etch equipment includes mechanisms to selectively remove materials (e.g. oxide) from a wafer surface or thin films on the wafer surface patterned with lithography equipment. ECD is a process step in a copper damascene flow that is used to deposit copper material within the interconnect structures.

However, significant variations may arise during the process of manufacturing the IC, such as variations in feature density, widths, and heights caused by lithography, CMP, and/or plating processes. For example, variations based upon CMP and plating process are often caused by oxide loss, dishing, erosion, or other copper losses.

One way to reduce the variations in fabricated chips is to use a pattern-dependent model to predict variations of feature dimensions of an integrated circuit. Pattern-dependent models can also be used to predict topological variations of an integrated circuit. Further details regarding one approach for implementing and using pattern-dependent models is disclosed in US Patent Publication 2003/0229412, filed on Dec. 11, 2003, entitled "Electronic design for integrated circuits based on process related variations," which is hereby incorporated by reference in its entirety.

At semiconductor manufacturing process node 65 nm and beyond, it becomes more and more useful for the designer to have access to accurate modeling of systematic variations, e.g., variations caused by manufacturing issues such as Chemical Mechanical Polishing (CMP), etch and lithography. These models are very useful at the design stage for achieving higher chip performance, yield, and time-to-volume.

Traditional design-process interfaces based on design rules cannot capture new design-dependent manufacturing problems that are introduced with smaller geometries and more complex process stacks. Designs that pass design rule checks (DRC) might not be manufacturable due to catastrophic CMP, etch or RET (resolution enhancement technique) failures. Recently, physics based modeling has been introduced to predict full chip topographic variations caused by CMP processes.

EDA products, such as CMP prediction tools, use accurate models to identify potential manufacturing problems, or "hotspots", such as copper pooling or large step heights between copper and dielectric. The model can also be used to correct hotspots using metal fill and other techniques available in post-route optimization, such as wire spreading or wire splitting. In CMP, one of the biggest challenges is to correct hotspots in each large section, or "block," of the design while still accounting for the long-range impact from other parts of the design hundreds of microns away.

SUMMARY OF THE INVENTION

Some embodiments of the present invention are directed to a method, system, and computer program product for performing predictions for an electronic design. Embodiments of the invention allow the ability to efficiently update the model predictions at a later time once previously incomplete blocks are completed. Predictions can be efficiently updated after block designs are updated (e.g. after correcting problems detected from model predictions). Another benefit provided by embodiments of the invention is that it allows multiple block designers to work on their designs independently and share their updates with other block designers.

Other and additional objects, features, and advantages of the invention are described in the detailed description, figures, and claims.

BRIEF DESCRIPTION OF FIGURES

FIG. 5 illustrates multiple users performing updates and predictions for the design.

DETAILED DESCRIPTION

Embodiments of the invention are directed to approaches for performing model-based predictions and for performing updates to full-chip predictions for an integrated circuit design. As used herein, the term "model" refers to a set of data that identifies one or more specific characteristics within an IC design, layout, and/or data relating to its effect, manufacturability, and/or usability. Examples of such models include manufacturability models, CMP (chemical mechanical polishing) models, etch models, lithography models, and electrical models.

In some embodiments, the invention is implemented by creating a database or file of the design information that is based upon modeling or modeling parameterization, and using the model-created or model-derived database or file as the medium of communication to perform predictions. In effect, the model-created database or file is used as the underlying data set for the prediction analysis, rather than requiring the entirety of the full chip geometric information to perform the prediction analysis.

For purposes of illustration, the example approach(es) described in this document is illustrated with respect to model parameter extraction (e.g. simplifications of design geometries) and model-based predictions based upon such model parameters, such as CMP predictions. It is noted, however, that the invention can be applied to any modeling paradigm, and is therefore not to be limited to only the example approaches described and illustrated herein.

The present invention provides numerous advantages over alternative approaches. For example, embodiments of the invention provide the ability to load a top-level design and combine or update multiple block designs from separate files or databases. Moreover, embodiments of the invention allow an initial model parameter analysis (e.g. geometry analysis) of full-chip to be performed. In addition, the present invention according to certain embodiments permits target values to be assigned for incomplete blocks. Incremental model parameter analyses may be performed for updated blocks. Some embodiments provide the ability to perform model predictions, either for full-chip or for individual parts (e.g. blocks), based on updates to design (either partial or full). Another advantage of embodiments of the invention is that it allows use of a database or file of the design information required for modeling as a means to allow different design groups to collaborate.

Figure 1:
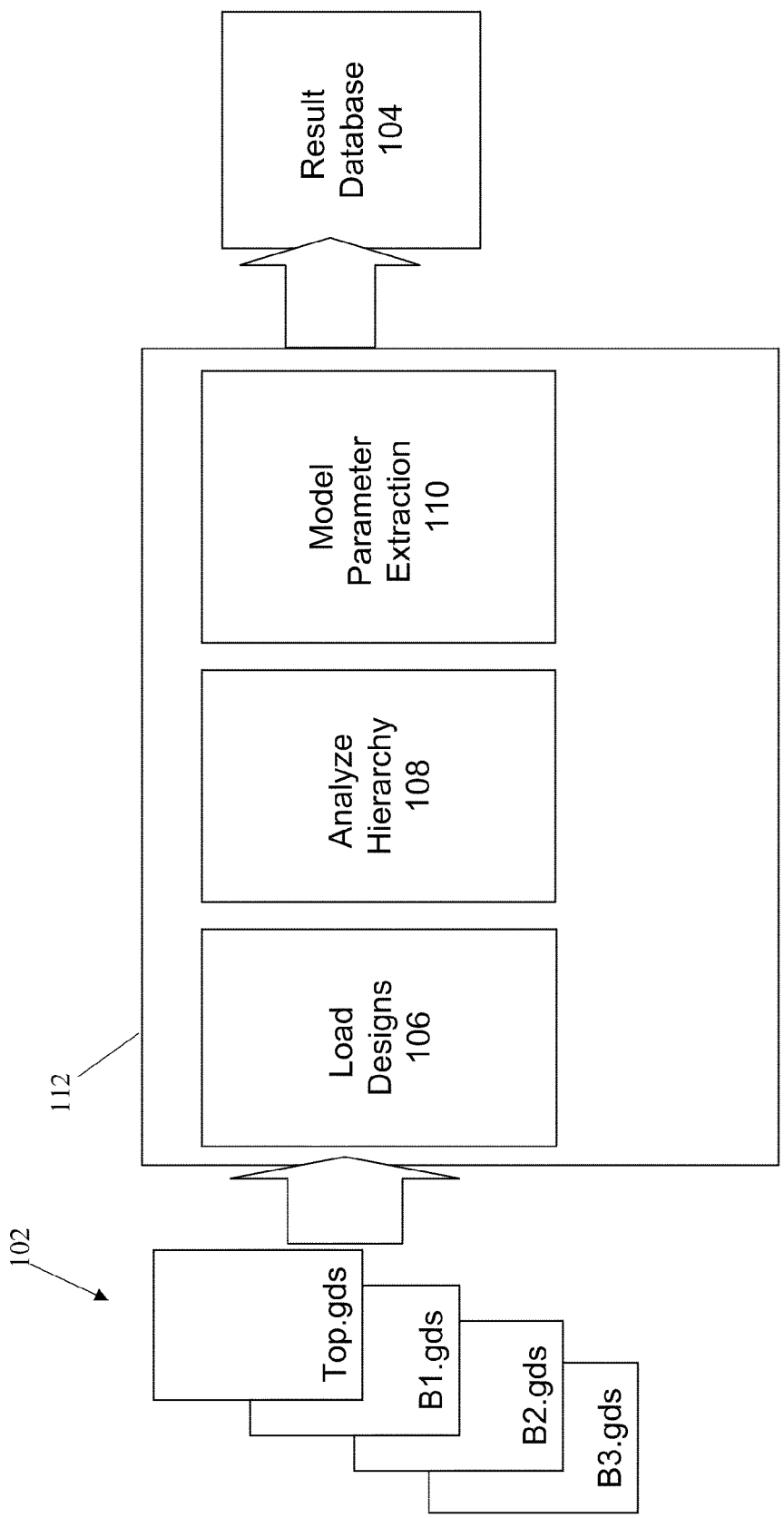
FIG. 1 illustrates an architectural flow for an embodiment of the invention.

FIG. 1 provides an overview of the architectural process for creating a database or file of design information for performing predictions according to some embodiment of the invention. The data creation process/mechanism 112 receives the geometric information about the IC design by receiving design files 102 about the different layers and blocks in the design. In the example of FIG. 1, files 102 in the GDS format are received for the top cell of the design, which includes blocks B1-B3. The full geometric information about each block B1, B2, and B3 are located in the respective GDS files for these blocks.

Traditionally, the full geometric information contained in these files would have to be used to perform relevant predictions, such as CMP predictions. The problem is that modern IC designs are so large and detailed, that the full geometric information is likely to be a very large quantity of data for a typical design. Therefore, a considerable amount of system resources would be consumed to maintain and distribute this information. In addition, if there are multiple groups of distributed designers working on individual portions of the design, then the entirety of that large quantity of geometric data would have to be distributed to each of those design groups, either on a regular basis, or even worse, upon the updating of a portion of the overall design by another design group.

With the present embodiment, a results database 104 is created that abstracts the model parameter information (e.g. geometric extraction) into a set of information, much smaller in volume than the full geometric data, which nevertheless can be used to perform the relevant model-based predictions. As shown in FIG. 1, this is accomplished at 106 by loading the geometric information about the different portions and blocks of the design, e.g., the GDS ("Graphic Data System") files for blocks B1, B2, and B3. If a hierarchical design approach is being used, then the next action at 108 is to perform hierarchical analysis upon the different cells and blocks in the design. This identifies and organizes the relationship between the instances and cells in the design.

Next, geometry extraction is performed at 110 to identify the relevant geometric characteristics and parameters of the different portions, blocks, and cells in the design. Such information could include, for example, perimeter, density, and line width information. This information is extracted for each instance in the design. The extracted information is then suitably formatted and stored within the results database in data structures that are suitably configured to hold the information.

Figure 2:
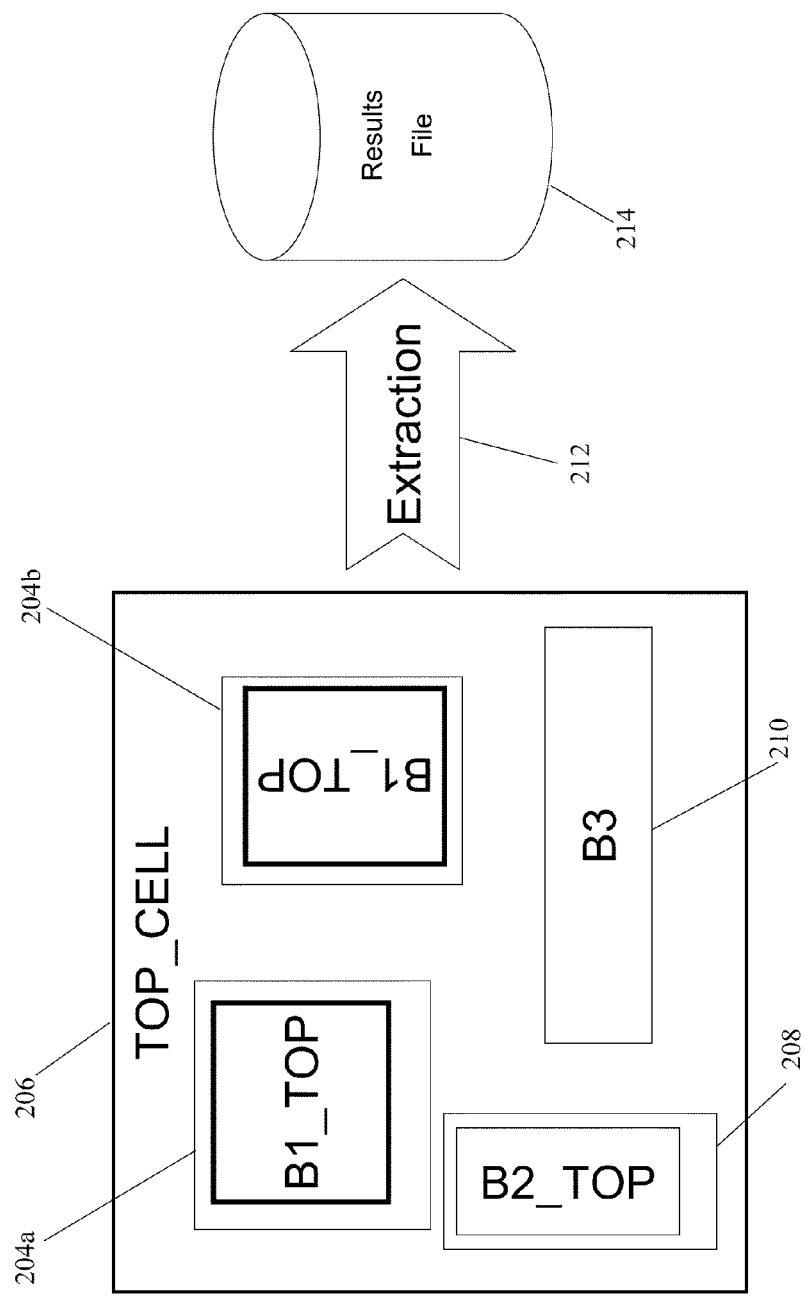
FIG. 2 illustrates an approach for performing model parameter extraction according to some embodiments of the invention.

FIG. 2 visually illustrates this process. The left portion of this figure shows the layout for the top cell 206 of the example design portion under examination. The top cell 206 includes two instances 204a and 204b of block B1_top, with one rotated ninety degrees from the other version of the same block. The top cell 206 also includes an instance 208 of block B2_top and an instance 210 of block B3. The geometry extraction process 212 is performed to extract the relevant geometric information to create the result file 214 shown on the right-hand portion of the figure. As noted above, such information could include, for example, perimeter, density, and line width information.

This document will now describe how the invention can be used to improve the process of performing predictions. For example, assume that there are designers working to update the designs for blocks B1 and B2, e.g., based upon an engineering change order (ECO). Further assume that the designers would like to perform a prediction after updating the design.

With the present invention, the designers do not need to have the full GDS geometry files for the entire chip to perform the update and then run a prediction. Instead, after a block has been updated, the result file from the previous geometry extraction can be modified with those updates, and used to perform the prediction. In effect, the invention automatically recognizes those areas in which a change has occurred, and goes in to the results database to correctly re-calculate the appropriate parameters to reflect those changes.

The updated predictions can be at any level of granularity for the design. The prediction can be either an updated full chip prediction, e.g., if the updated block corresponds to instances all over the chip. Alternatively, the update prediction can be a partial chip prediction, e.g., only for the area around the updated block. The latter approach significantly reduces the required computations and significantly decreases the time required to obtain a prediction.

Embodiments of the invention can be applied to perform predictions for hierarchical designs. For example, for a hierarchical approach for two levels of hierarchy, there will be a top-level and one or more sub-level blocks. The blocks may be any size or configuration, but are typically rectangular, which do not overlap but may abut one another. Alternatively, the blocks may be overlapping and rectilinear (polygon) blocks.

The invention may be applied to both engineering changes (e.g., to implement an "ECO" or engineering change order) or used for design planning. For an ECO, the invention is applied to modify an existing design. For design planning, the invention may be applied to implement a new design.

In some embodiments, a non-exact grid match is implemented. Typically, the blocks to be updated will not line up exactly with the grid used for modeling. Therefore, all the grids that overlap with the block to be updated must be recalculated. Also in this approach, multiple block instances result in multiple extractions upon replacing the master block. The grids to be updated are determined for all instances of the block. A block movement results in a redo of the extraction in the top level.

Figure 3:
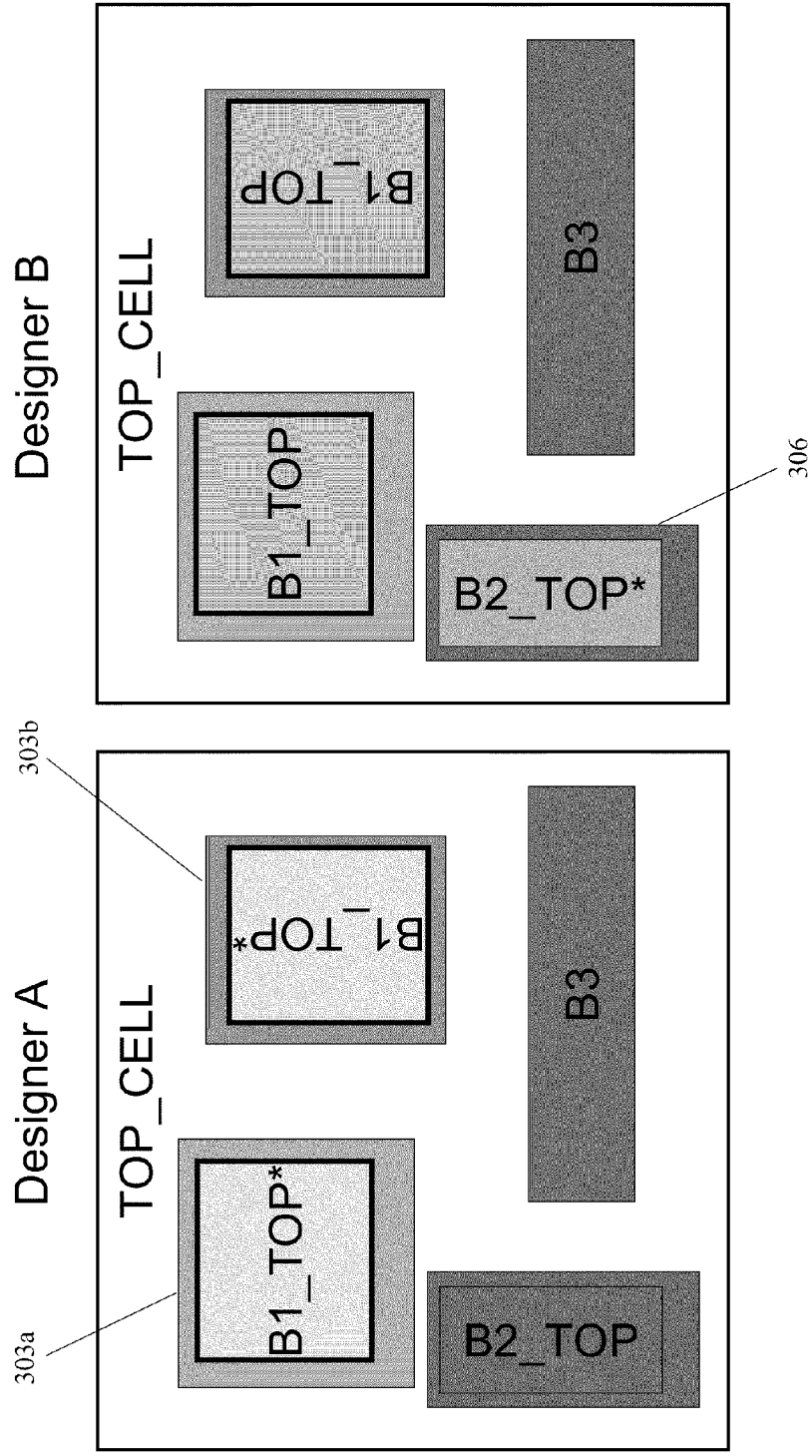
FIG. 3 shows an embodiment of the invention applied to the situation in which multiple designers are working on the same design.

The present methodology is particularly useful if there are multiple designers working on the overall design. FIG. 3 illustrates one circumstance of this, in which the left side of the figure shows a first designer, Designer A, performing updates to block B1 (represented as instances 303a and 303b). The right portion of the figure shows a second designer, Designer B, performing updates to block B2 (represented as instance 306). In this circumstance, it is quite likely that Designer A does not have direct access to the details of block B2 and Designer B does not have direct access to the details of block B1. However, each of these designers will need to perform a prediction, and therefore will need to have enough information about the block being updated by the other designer to be able to perform a prediction.

Figure 4:
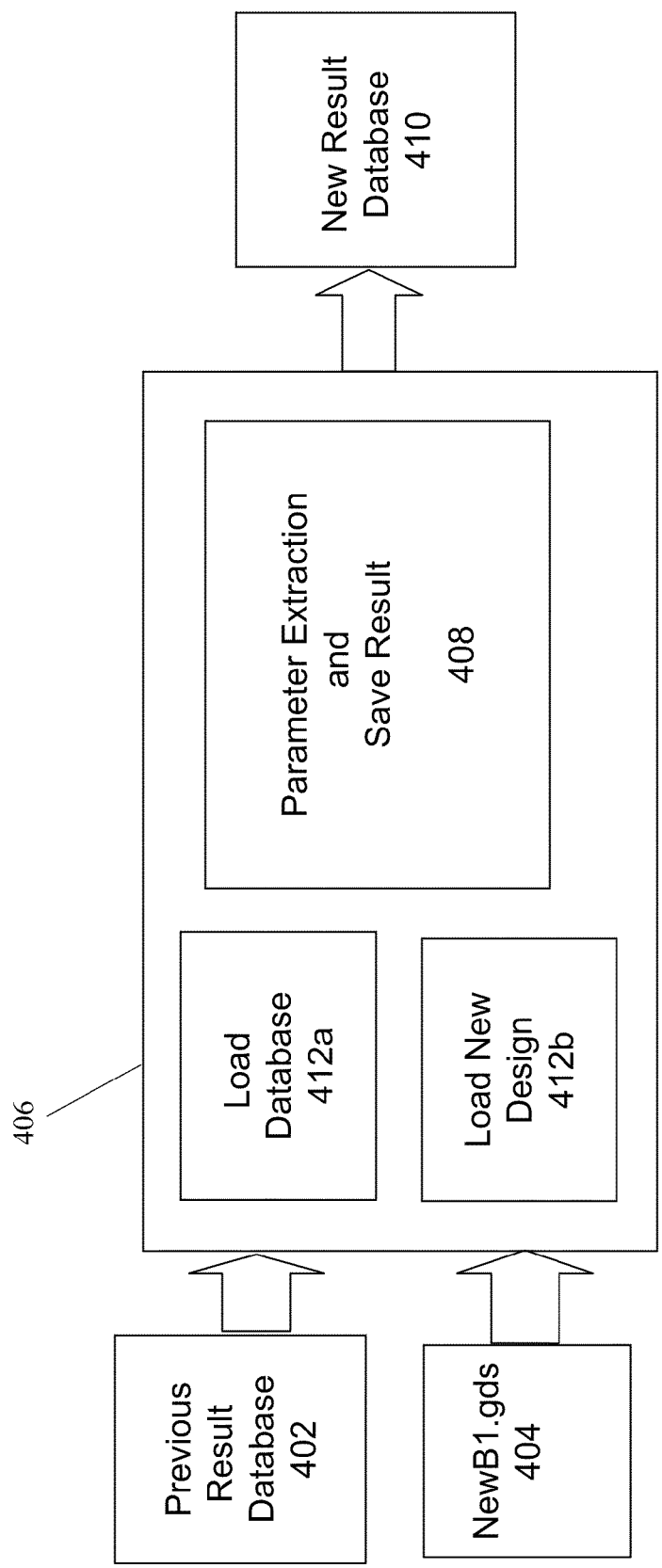
FIG. 4 shows an embodiment of the invention applied to load a modified block to generate a new results database.

With embodiments of the invention, it is the results database that is distributed to Designers A and B. As shown in FIG. 4, after performing the update to block B1, the results database 402 and the new version 404 of block B1 are loaded 412a, 412b in the processing system 406. It is noted that the invention can be configured to track not just the updates to single modified block, but also all instances and transforms of the updated block. Model parameter extraction 408 would be performed to generate and save an updated version 410 of the results database. Designer A would use the updated results database to perform the CMP prediction corresponding to block B1.

The updated result file and the updated version of the block can then be distributed or suitably made available to other designers, including Designer B. As noted above, Designer B is making updates to block B2. After performing the update to block B2, Designer B would use the results database to perform the CMP prediction. Since the results database had already been updated based upon the changes introduced to block B1 by Designer A, the prediction run by Designer B will be accurate with respect to the most recent changes introduced by Designer A. In addition, this prediction can be performed by Designer B without requiring access to the detailed GDS file for the block B1 being operated upon by the other designer.

Under certain circumstances, it is possible that the analysis for a particular block or portion of the design may need to have access to the detailed geometry data. This may occur, for example, if there is a grid overlap between a first block and a second block, in which both the first block being updated and the second block share a modeling grid. In this situation the full geometry for both blocks may need to be available in order to obtain the most accurate model parameter extraction.

In some embodiments of the invention, this situation can be handled in a number of different ways. If the analysis results would not be significantly affected (e.g., because the block is relatively large and the degree of overlap is relatively small) or if the intent is to only generally or roughly predict the change of the block, then the details of the block that overlaps the grid may be ignored. However, if the intent is to ensure the most accurate prediction, the preferred embodiment would make the full geometry available for the second block. This can be accomplished, for example, by maintaining an accessible location (e.g. a shared directory) with the necessary geometric details of the block, e.g., the officially released versions of all blocks. Alternatively, the geometric details for the overlapping blocks can be distributed with the results database/file.

A sequence of ECO updates by two designers is outlined in FIG. 5. For Designer A, the results database is opened at 502 and the top level cell of the hierarchy is reported at 504. Designer A would open the design for the updated block B1 at 506, which would allow the system to recognize that block B1 has been updated. Extraction would be performed at 508 to re-extract B1 and return the full chip extraction with the new block B1. Prediction, e.g., CMP prediction, can then be performed at 510.

Similarly, for Designer B, the results database is opened at 512 and the top level cell of the hierarchy is reported at 514. In this case, it is possible that the results database is a version that has been updated based upon the previous modification by Designer A. Designer B would open the design for the updated block B2 at 516, which would allow the system to recognize that block B2 has been updated. An extraction would be performed at 518 to re-extract B2 and return the full chip extraction with the new block B2. Prediction, e.g., CMP prediction, can then be performed at 520.

Therefore, the invention allows design teams to run predictions of their block in the context of the full design by passing a significantly reduced amount of information (i.e. only the information related to modeling) among one another in a format that can be updated independently by different design teams. Current methods make it very difficult for block design teams to run predictions of their blocks in the context of the full-chip design because the design information for different parts of the design are not easily passed among the design groups. The file or database is passed between the design groups and each design group updates the design information that they are responsible for. Any design group running a model prediction uses the database (with the other groups most recent updates) to run their model predictions. This allows each design group to evaluate design changes using predictions based on the most up-to-date, but possibly incomplete, design information.

Figure 6:
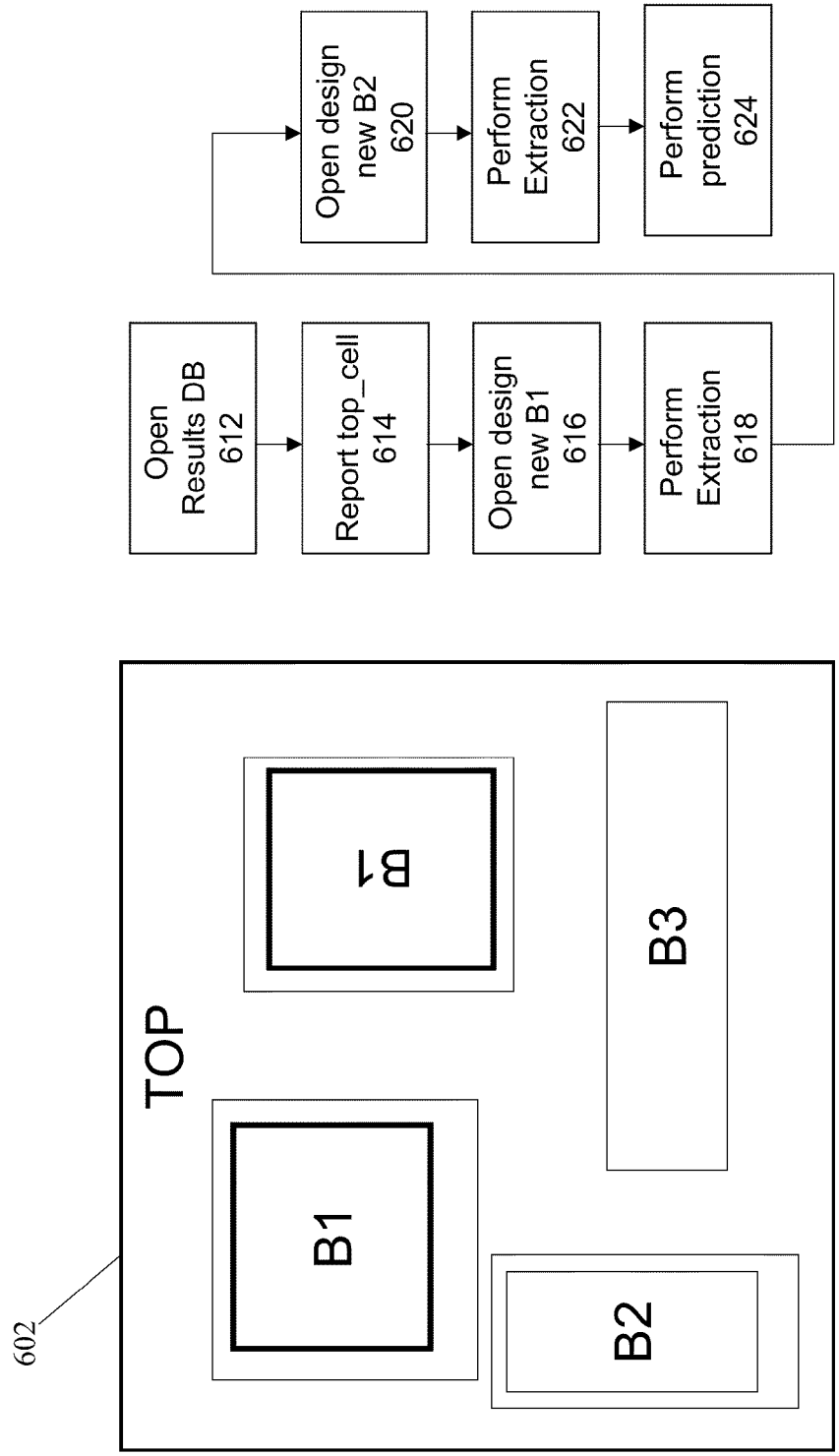
FIG. 6 illustrates updating an extraction for blocks in a design.

FIG. 6 shows another use scenario for the invention, in which blocks B1 and B2 are modified in the design. In the sequence of FIG. 6, the results database is opened at 612 and the top cell 602 is reported at 614. The design of block B1 is then opened at 616 and updated. Thereafter, block-level extraction is performed at 618 relative to the updated block B1. Similarly, the design of block B2 is opened at 620 and updated. Block-level extraction is then performed at 622 relative to the updated block B2. Prediction, e.g., CMP prediction, can then be performed at 624.

This demonstrates that the invention can be configured to use information about the design structure to update only the information required for modeling for the region of the design that needs to be updated. This significantly improved turnaround time for re-running predictions. This is a significant advantage over methods that require an entire design to be replaced and new model predictions to be run in order to update model predictions when a part of the design is changed.

The invention also allows model-based predictions to be re-run for only the portion of the design that has changed (or the changed region plus some additional area, e.g., a halo), assuming the model can accommodate this (e.g., it can be run on a region). This avoids having to re-run of a full-chip prediction.

In an alternate embodiment, model simulations can be performed even if there is insufficient information about a particular block or instance in a design. For example, assume that the layout includes a memory cell which has not yet been designed or for which relevant design information has not yet been received. The flow of FIG. 1 can be modified to include an estimation action in which the geometry information for that block or cell is estimated, e.g., based upon prior memory cell designs or based upon heuristic analysis. That estimated information is used to perform geometry extraction such that an estimated set of information, such as density, line width, or perimeter information, for the memory cell is used for the results database.

This highlights a particular advantage of embodiments of the invention, which allows information related to modeling to be estimated for the incomplete parts of the design, thus allowing a full-chip prediction. This avoids the drawback with methods that require the entire design to be completed before predictions can run.

As noted above, the approach can be used to re-run predictions for the entire design, or one could also re-run the prediction for only a portion of the design (e.g. the block of interest). One could assign the blocks to be tracked or updated, or one could suitably configure the present framework to determine and track these changes automatically.

Either a robust version that could account for overlapping blocks or a simpler version that does not handle overlapping blocks could be used. Either a more flexible method could be used that allowed multiple levels of hierarchy or simpler method that only handles one or two levels of hierarchy could be used.

A simple file could be used for passing the design information for modeling or a database could be used. The design information for modeling could be placed in a central location for all designers or design teams to use (e.g. by locking or checking out a copy) or the file could be passed around more informally.

SYSTEM ARCHITECTURE OVERVIEW

Figure 7:
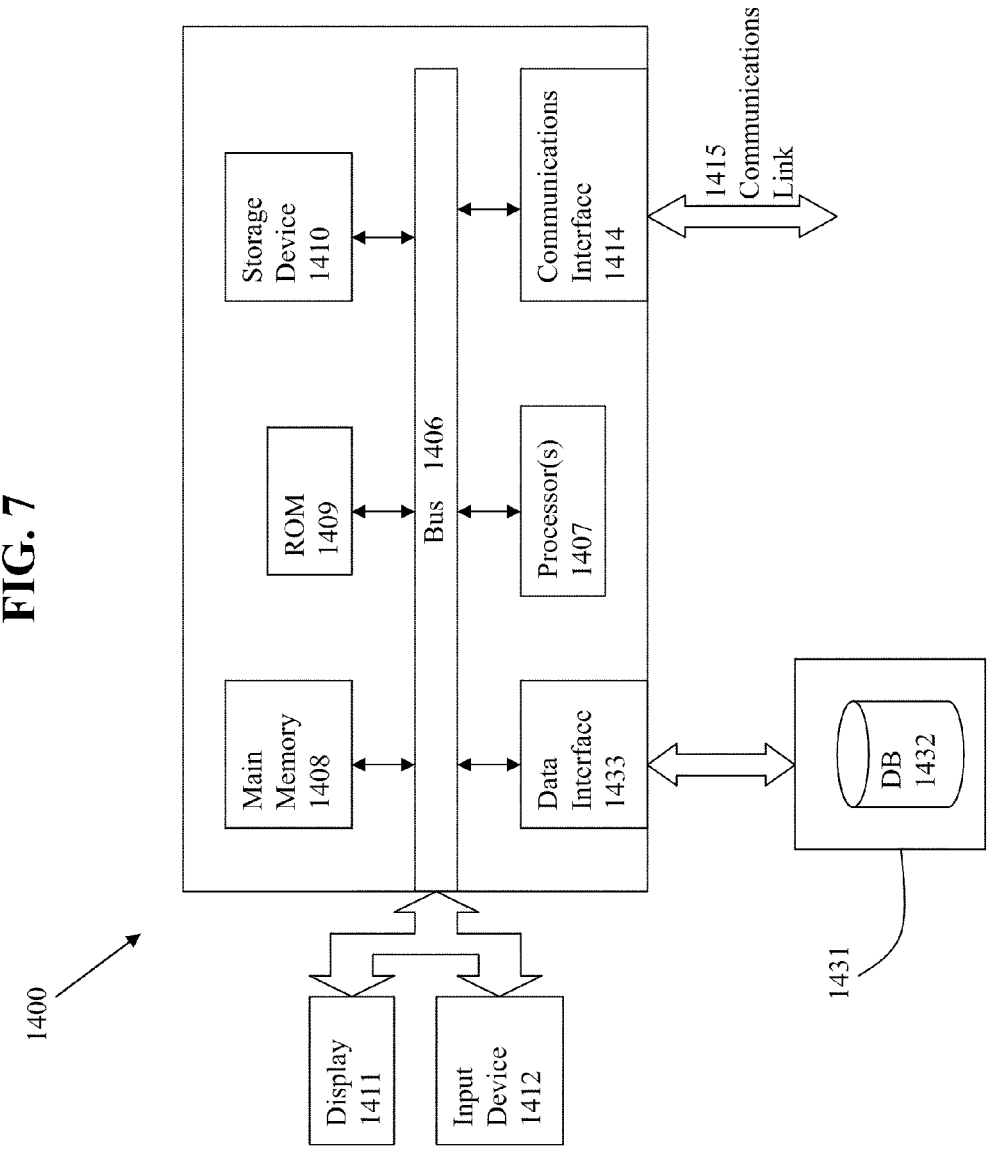
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through data interface 1433 with a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method for performing analysis upon an electronic design, comprising:
   receiving incomplete design data for an electronic design, which includes an incomplete electronic component design that is to be created in the electronic design, and information related to one or more models corresponding to a manufacturing process to be applied to manufacture the electronic design;
   using a computer processor to perform model parameter determination for at least the incomplete electronic component design to generate a set of results data, wherein the set of results data comprises simplification of one or more geometries that are not yet created for the incomplete design data rather than all geometric information of the one or more geometries; and
   performing predictions of manufacturing effects for the electronic design for the manufacturing process before creation of the incomplete electronic component design, wherein the incomplete design data is not sent in its entirety to perform the predictions.

2. The method of claim 1 in which the incomplete design data comprises layout data that includes geometric information related to the electronic design.

3. The method of claim 1 further comprising performing hierarchical analysis upon the incomplete design data to identify and organize relationships between instances and cells in the electronic design.

4. The method of claim 1 in which the model parameter extraction comprises geometry extraction that identifies relevant geometric characteristics and parameters of portions of the electronic design.

5. The method of claim 4 in which the relevant geometric characteristics and parameters of portions of the electronic design comprises perimeter, density, and line width information.

6. The method of claim 1 in which the results data is extracted for each instance in the electronic design.

7. The method of claim 1 in which the results data is updated based upon modification made by the designer to portions of the electronic design, wherein the results data with updates can be used by a second designer to perform predictions.

8. The method of claim 1 applied to either engineering change orders (ECO) or design planning.

9. The method of claim 1 in which the prediction comprises CMP, lithography, etch, or electrical predictions.

10. The method of claim 1 in which the predictions are performed only for a portion of the electronic design that has changed.

11. The method of claim 1 in which estimation is performed for one or more portions of the electronic design for which there is insufficient geometric information.

12. The method of claim 1 in which the results data comprises combined information from separate design files or databases from users that do not have access to the design files or the databases operated by other users.

13. A computer program product embodied on a non-transitory computer usable storage medium, the non-transitory computer readable storage medium having stored thereon a sequence of instructions which, when executed by a processor causes the processor to execute a method for performing analysis upon an electronic design, the method comprising:
receiving incomplete design data for an electronic design, which includes an incomplete electronic component design that is to be created in the electronic design, and information related to one or more models corresponding to a manufacturing process to be applied to manufacture the electronic design;
using a computer processor to perform model parameter determination for at least the incomplete electronic component design to generate a set of results data, wherein
the set of results data comprises simplification of one or more geometries that are not yet created for the incomplete design data rather than all geometric information of the one or more geometries; and
performing predictions of manufacturing effects for the electronic design for the manufacturing process before creation of the incomplete electronic component design, wherein
the incomplete design data is not sent in its entirety to perform the predictions.

14. The computer program product of claim 13 in which the incomplete design data comprises layout data that includes geometric information related to the electronic design.

15. The computer program product of claim 13 further comprising performing hierarchical analysis upon the incomplete design data to identify and organize relationships between instances and cells in the electronic design.

16. The computer program product of claim 13 in which the model parameter extraction comprises geometry extraction that identifies relevant geometric characteristics and parameters of portions of the electronic design.

17. The computer program product of claim 16 in which the relevant geometric characteristics and parameters of portions of the electronic design comprises perimeter, density, and line width information.

18. The computer program product of claim 13 in which the results data is extracted for each instance in the electronic design.

19. The computer program product of claim 13 in which the results data is updated based upon modification made by the designer to portions of the electronic design, wherein the results data with updates can be used by a second designer to perform predictions.

20. The computer program product of claim 13 applied to either engineering change orders (ECO) or design planning.

21. The computer program product of claim 13 in which the prediction comprises CMP, lithography, etch, or electrical predictions.

22. The computer program product of claim 13 in which the predictions are performed only for a portion of the electronic design that has changed.

23. The computer program product of claim 13 in which estimation is performed for one or more portions of the electronic design for which there is insufficient geometric information.

24. The computer program product of claim 13 in which the results data comprises combined information from separate design files or databases from users that do not have access to the design files or the databases operated by other users.

25. A system for performing analysis upon an electronic design, comprising:
a processor to execute computer program code;
a memory for holding the computer program code, the computer program code comprising instruction to:
receive incomplete design data for an electronic design, which includes an incomplete electronic component design that is to be created in the electronic design, and information related to one or more models corresponding to a manufacturing process to be applied to manufacture the electronic design,
use the computer processor to perform model parameter determination for at least the incomplete electronic component design to generate a set of results data, wherein
the set of results data comprises simplification of one or more geometries that are not yet created for the incomplete design data rather than all geometric information of the one or more geometries; and
perform predictions of manufacturing effects for the electronic design for the manufacturing process before creation of the incomplete electronic component design, wherein
the incomplete design data is not sent in its entirety to perform the predictions.

26. The system of claim 25 in which the incomplete design data comprises layout data that includes geometric information related to the electronic design.

27. The system of claim 25 in which the computer program code further comprises program code for performing hierarchical analysis upon the incomplete design data to identify and organize relationships between instances and cells in the electronic design.

28. The system of claim 25 in which the model parameter extraction comprises geometry extraction that identifies relevant geometric characteristics and parameters of portions of the electronic design.

29. The system of claim 28 in which the relevant geometric characteristics and parameters of portions of the electronic design comprises perimeter, density, and line width information.

30. The system of claim 25 in which the results data is extracted for each instance in the electronic design.

31. The system of claim 25 in which the results data is updated based upon modification made by the designer to portions of the electronic design, wherein the results data with updates can be used by a second designer to perform predictions.

32. The system of claim 25 applied to either engineering change orders (ECO) or design planning.

33. The system of claim 25 in which the prediction comprises CMP, lithography, etch, or electrical predictions.

34. The system of claim 25 in which the predictions are performed only for a portion of the electronic design that has changed.

35. The system of claim 25 in which estimation is performed for one or more portions of the electronic design for which there is insufficient geometric information.

36. The system of claim 25 in which the results data comprises combined information from separate design files or databases from users that do not have access to the design files or the databases operated by other users.

* * * * *